United States Patent [19]

Iwai

[11] 4,418,304
[45] Nov. 29, 1983

[54] CIRCUIT FOR CONTROLLING ROTATION OF MOTOR

[75] Inventor: Hiroshi Iwai, Yokohama, Japan

[73] Assignee: Victor Company of Japan, Ltd., Yokohama, Japan

[21] Appl. No.: 251,778

[22] Filed: Apr. 7, 1981

[30] Foreign Application Priority Data

Apr. 7, 1980 [JP] Japan .................................. 55-45463

[51] Int. Cl.³ ............................................. H02P 5/16
[52] U.S. Cl. .................................... 318/311; 318/314
[58] Field of Search ............................... 318/309–312, 318/314, 315

[56] References Cited

U.S. PATENT DOCUMENTS

| 3,600,657 | 8/1971 | Pfaff et al. ................. 318/315 X |
| 4,243,921 | 1/1981 | Tamura et al. .................. 318/314 |
| 4,278,925 | 7/1981 | Minakuchi ........................ 318/314 |

FOREIGN PATENT DOCUMENTS 2844139  4/1979  Fed. Rep. of Germany ...... 318/311

Primary Examiner—J. V. Truhe
Assistant Examiner—W. E. Duncanson, Jr.
Attorney, Agent, or Firm—Louis Bernat

[57] ABSTRACT

A circuit for controlling rotation of motor comprises a frequency generator for generating a rotational velocity signal responsive to the rotational velocity of a motor whose rotation is to be controlled, reference signal generator for generating a reference signal, phase comparator for comparing the phases of the rotational velocity signal and the reference signal, a multiplexing circuit for multiplexing the rotational velocity signal and the output signal of the phase comparator, a sample-and-hold circuit for sampling and holding the output multiplexed signal of the multiplexing circuit by the rotational velocity signal, and a controlling circuit for controlling the rotation of the motor by the output signal of the sample-and-hold circuit.

5 Claims, 18 Drawing Figures

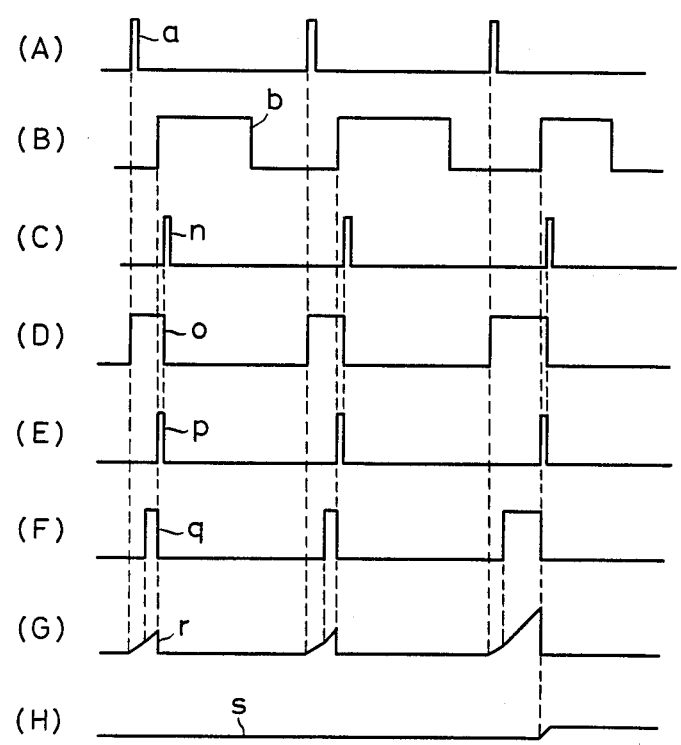

CIRCUIT FOR CONTROLLING ROTATION OF MOTOR

BACKGROUND OF THE INVENTION

The present invention relates generally to circuits for controlling rotation of motors, and more particularly to a circuit which controls the rotation of a motor by a type of a phase locked loop (PLL), by using a signal in which a signal responsive to the phase difference between an output velocity signal of a frequency generator which is responsive to the rotation of the motor and a reference signal, and a signal responsive to the velocity signal frequency, are multiplexed.

As an example of a conventional circuit for controlling the rotation of a motor in a record player, tape recorder, and the like, for example, there has been a circuit comprising a frequency-voltage converting circuit including a first sawtooth wave generating circuit supplied with the output of a frequency generator which is connected to a rotary shaft of a motor, and a first sample-and-hold circuit, phase difference-voltage converting circuit including a second sawtooth wave generating circuit supplied with the outputs of a reference signal generator and the above frequency generator, and a second sample-and-hold circuit, and a circuit for adding the outputs of the above frequency-voltage converting circuit and the phase difference-voltage converting circuit, to control the rotational driving of the motor by the added output thus obtained.

However, in this conventional circuit, the circuit construction became complex since a total of two sample-and-hold circuits were required for each of the above frequency-voltage converting circuit and the phase difference-voltage converting circuit, and suffered disadvantages in that the number of circuit elements became large and the circuit could not be manufactured at low cost. Especially when realizing the circuit in an integrated circuit (IC), noise due to the leak current in the sample-and-hole circuit is large, and problems are introduced upon forming of the above integrated circuit.

SUMMARY OF THE INVENTION

Accordingly, a general object of the present invention is to provide a novel and useful circuit for controlling rotation of motor in which the above described problems have been overcome.

Another and more specific object of the present invention is to provide a circuit for controlling rotation of motor, which has a single sample-and-hold circuit which multiplexes a signal respective of the phase difference between an output velocity signal obtained from a frequency generator according to the rotation of a motor and a reference signal, and a sawtooth wave signal respective of the frequency of the velocity signal, and samples and holds this multiplexed signal thus obtained according to the velocity signal. According to the circuit of the present invention, only one sample-and-hold circuit is required as opposed to the conventional circuit which required two sample-and-hold circuits. Therefore, the circuit construction of the circuit according to the present invention is simple, and can be manufactured at low cost. Especially when forming the circuit into an integrated circuit, the required chip area can be reduced for the number of sample-and-hold circuits which become unnecessary, and furthermore, the number of external terminals and the number of external parts can be reduced. In addition, the effect of the leak current of the sample-and-hold circuit can be reduced.

Other objects and further features of the present invention will be apparent from the following detailed description when read in conjunction with the accompanying drawings.

BRIEF DESCRIPTION OF THE DRAWINGS

FIG. 5(A) through 5(H) are graphs respectively showing the waveforms of signals at each part of the circuit system shown in FIG. 4.

DETAILED DESCRIPTION

Figure 1:
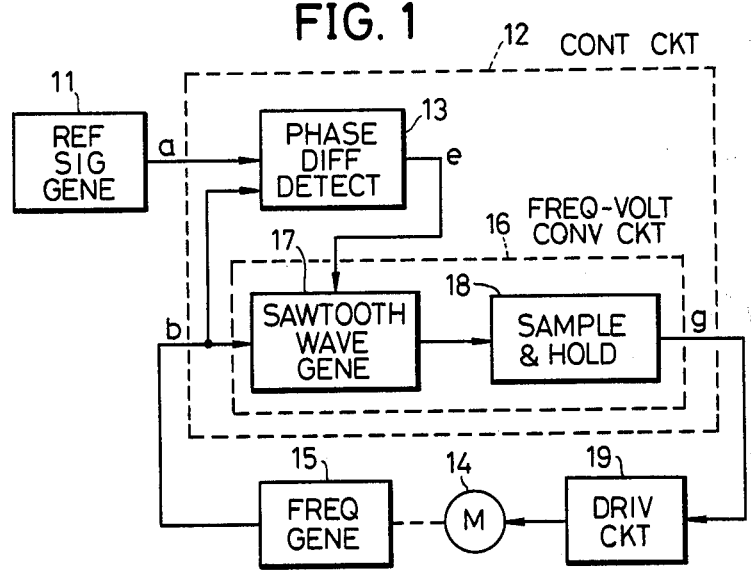
FIG. 1 is a systematic block diagram showing an embodiment of a circuit for controlling rotation of motor, according to the present invention.
Figure 2:
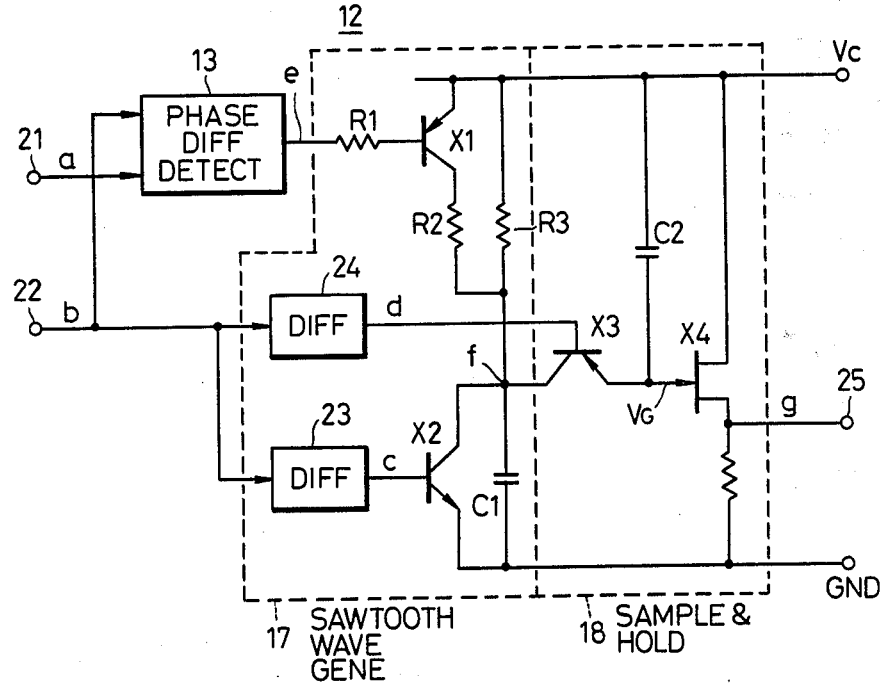
FIG. 2 is a concrete circuit diagram showing control circuit part which forms the essential part of the block system shown in FIG. 1.
Figure 3:
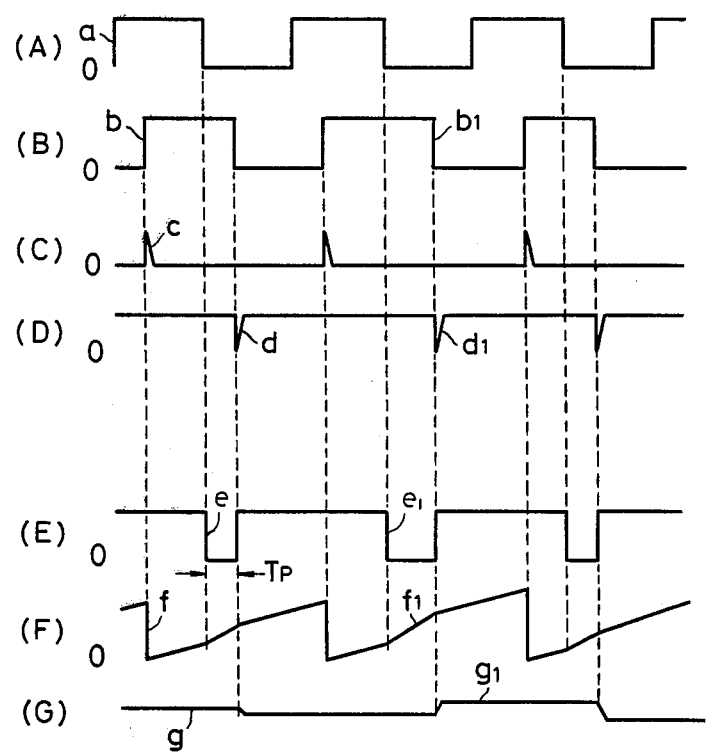
FIG. 3(A) through 3(G) are graphs respectively showing the waveforms of signals at each part of the block system shown in FIG. 1 and the circuit shown in FIG. 2.

In FIGS. 1 and 2, a reference signal a shown in FIG. 3(A) of a reference signal generator 11, is supplied to a phase difference detector 13 within a control circuit 12 which is shown by dotted lines in FIG. 1, through a terminal 21. On the other hand, a velocity signal b shown in FIG. 3(B) of a frequency generator 15 which is connected to a rotary shaft of a motor 14 whose rotation is to be controlled, is supplied to the above phase difference detector 13 and a sawtooth wave generator 17, through a terminal 22. The sawtooth wave generator 17 forms a frequency-voltage converting circuit 16 together with a sample-and-hold circuit 16.

In the present embodiment of the invention, the phase difference detector 13 is constructed from a logic circuit which produces a low-level (L-level) output only when the input reference signal a is of L-level and the input velocity signal b is of high-level (H-level). A signal e shown in FIG. 3(E) which is responsive to the phase difference between the reference signal a and the velocity signal b, is obtained from the phase difference detector 13. This output signal e obtained from the phase difference detector 13 is applied to the base of a PNP-transistor X1 through a resistor R1. The emitter of the transistor X1 is connected to a voltage source Vc, and the collector of the transistor X1 is connected to a capacitor C1 through a resistor R2. The transistor X1 is turned ON during the period in which the signal e is of L-level, and the capacitor C1 is charged during this period through the transistor X1 and the resistor R2.

The velocity signal b supplied from the terminal 22 is differentiated at a differentiator 23 within the sawtooth wave generator 17, and differentiated pulses c respective of the rising edges of the velocity signal b are formed, as shown in FIG. 3(C). These pulses c are applied to the base of an NPN-transistor X2, to turn this transistor X2 ON. When the transistor X2 is turned ON, the electric charge stored within the capacitor C1 is discharged, and the transistor X2 is turned OFF after the pulse c disappears to charge the capacitor C1. From then on, the capacitor C1 repeats the above charging and discharging operation.

Upon charging of the capacitor C1 due to the turning OFF of the transistor X1, a large current flows through the capacitor C1 during the period in which the transistor X1 is ON compared to that flowing when the transistor X1 is OFF, because the transistor X1 is turned ON. Accordingly, a sawtooth wave voltage f shown in FIG. 3(F) is obtained through the terminal of the capacitor C1. The sawtooth wave voltage f is a voltage having a waveform in which a voltage from a circuit which comprises the resistors R1 and R2 and the transistor X1, is multiplexed with the voltage obtained from the repetitive charging and discharging performed with the period of the velocity signal b during the above charging period, according to the phase difference between the reference signal a and the velocity signal b. This voltage f can be considered as being a voltage which is responsive to the phase difference between the reference signal a and the velocity signal b, and the voltage responsive to the frequency of the velocity signal b are composed. The sawtooth wave voltage f is applied to the collector of a PNP-transistor X3 of the sample-and-hold circuit 18.

On the other hand, the velocity signal b obtained through the terminal 22 is differentiated at a differentiator 24, and as shown in FIG. 3(D), differentiated pulses d are formed responsive to the falling edges of the velocity signal b. These pulses d are applied to the base of the PNP-transistor X3 to turn this transistor X3 ON. The collector potential f of the transistor X2 shown in FIG. 3(F) is applied to the gate of a field-effect-transistor (FET) X4 and the capacitor C2, through the transistor X3. A voltage g shown in FIG. 3(G) obtained by sampling the voltage f which is applied to the collector of the transistor X3, with the timing of the pulses d of the differentiator 24 which are applied to the base of the transistor X2, is obtained from the source of the FET X4 through a terminal 25. The voltage g obtained through the terminal 25 is supplied to a driving circuit 19, to control the rotation of the motor 14. The above circuit as a whole constructs a type of a phase locked loop (PLL).

Since the capacitor C2 is connected to the gate of the FET X4 having a high input impedance, the potential of the capacitor C2 is held during the period in which the transistor X3 is OFF.

When the frequency of the velocity signal b is designated by $f_s$, and the phase difference between the falling edges of the reference signal a and the falling edges of the velocity signal b is designated by $T_p$, the gate potential $V_G$ of the FET X4 can be described by the following equation.

$$V_G = V_c \left( 1 - e^{-(\frac{1}{C1 \cdot R3 \cdot 2f_s} + \frac{T_p}{C1 \cdot R2})} \right)$$

Accordingly, as clearly seen from the above equation, the phase difference-voltage converting signal is multiplexed to the frequency-voltage converting signal in the voltage $V_G$.

Therefore, according to the circuit of the present invention, the circuit construction becomes simple, not requiring two sample-and-hold circuits as in the conventional circuit, since the motor driving signal is obtained by sampling the sawtooth wave signal f from the transistor X2 by the differentiated pulses d supplied from the differentiator 24, at the transistor X3.

In a case where the rotational velocity of the motor 14 decreases, the velocity signal becomes as shown by $b_1$ in FIG. 3(B), wherein the period from the rising edge to the falling edge is long. Thus, the output voltage of the phase difference detector 13 becomes as shown by $e_1$ in FIG. 3(E), wherein the period from the rising edge to the falling edge also is long. Accordingly, the charging period of the capacitor C1 due to the turning ON of the transistor X2 becomes long, and the waveform of the collector potential f of the transistor X2 becomes as shown by a waveform $f_1$ in FIG. 3(F). When the velocity signal $b_1$ is sampled and held by an output $d_1$ of the differentiator 24, a voltage shown by $g_1$ in FIG. 3(G) is obtained from the terminal 25, and the motor 14 is accordingly controlled so as to increase the rotational speed.

Figure 4:
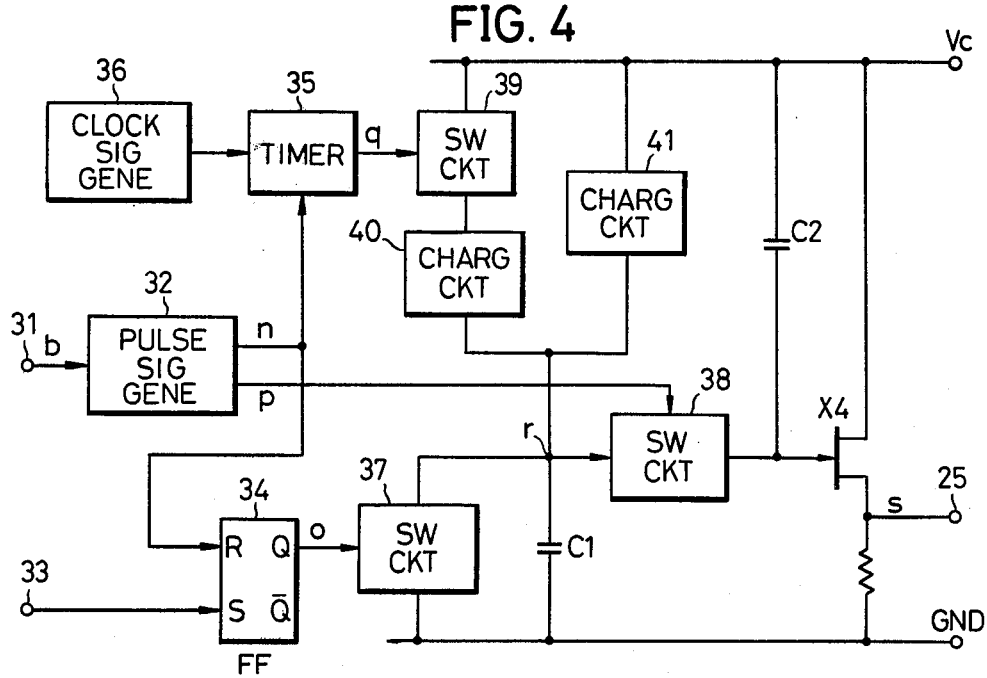
FIG. 4 is a systematic circuit diagram showing another embodiment of a circuit for controlling rotation of motor, according to the present invention.

Next, a second embodiment of a circuit according to the present invention will be described in conjunction with FIG. 4. The velocity signal b shown in FIG. 5(B) obtained from the frequency generator 15 according to the rotation of the motor 14, is supplied to a pulse signal generator 32 through a terminal 31. A pulse signal p having a predetermined width from the rising edges of the velocity signal b as shown in FIG. 5(E), and a pulse signal n having a predetermined width from the rising edges of the pulse signal p as shown in FIG. 5(C), are respectively obtained. The pulse signal p is supplied to a switching circuit 38, and the pulse signal n is supplied to respective reset terminals of a timer 35 and a reset-and-set (R-S) flip-flop 34.

On the other hand, the reference signal a of the reference signal generator 11 shown in FIG. 5(A), is supplied to the set terminal of the flip-flop 34 through a terminal 33. A signal o having a pulse width corresponding to the rise of the reference signal a and the rise of the signal n, that is, a pulse width responsive to the phase difference between the reference signal a and the velocity signal b, as shown in FIG. 5(D), is obtained from the flip-flop 34, and supplied to a switching circuit 37. The switching circuit 37 becomes ON during the period in which the signal o is of L-level, and thus, the electric charge stored within the capacitor C1 is discharged through the switching circuit 37. On the other hand, the switching circuit 37 becomes OFF during the period in which the signal o is of H-level, to charge the capacitor C1 through a charging circuit 41.

The timer 35 counts the clock signals supplied from a clock signal generator 36 from the time the velocity signal b rises, to count until a predetermined, and is reset by the signal n supplied from the pulse signal generator 32. A signal q shown in FIG. 5(F) having the same period as that of the velocity signal b and always having the same L-level periods (timer periods), is obtained from the timer 35, and then supplied to a switching circuit 39.

The switching circuit 39 becomes ON during the period in which the signal q is of H-level, and the capacitor C1 is charged through the switching circuit 39 and a charging circuit 40. Moreover, the switching circuit 39 becomes OFF during the period in which the signal q becomes of L-level. That is, the capacitor C1 is charged through the charging circuit 41 due to the turning OFF of the switching circuit 37 according to the signal o, and charged through the charging circuit 40 due to the turning ON of the switching circuit 39 according to the signal q. Accordingly, during the period in which the H-level periods of the signals o and q coincide, a large current flows through the capacitor C1 compared to that flowing at other periods. Thus, a sawtooth wave voltage r shown in FIG. 5(G) is obtained from the terminal of the capacitor C1. This sawtooth wave voltage r can be considered as being a voltage in which a voltage responsive to the phase difference between the reference signal a and the velocity signal b, and a voltage responsive to the frequency of the velocity signal b are composed, as in the case of the sawtooth wave voltage f in the above first embodiment of the invention.

The signal r is sampled at a switching circuit 38 by the signal p supplied from the pulse signal generator 32. A voltage s shown in FIG. 5(H) is obtained from the FET X4 through the output terminal 25, and supplied to the driving circuit 19 shown in FIG. 1.

In the circuit of the present embodiment of the invention, a signal q which becomes of L-level for a predeterined period (timer period) is obtained from the timer 35 by use of the velocity signal b, to charge the capacitor C1 by use of only the periods in which the signal q is of H-level. Accordingly, the frequency responsive to the rotation of the motor can be converted into a voltage with a high conversion rate, and the effect due to errors in the parts used is relatively small. Thus, the rotational control can be performed with high accuracy.

In addition, in both the first and second embodiment of the invention described above, the circuit is constructed so that a voltage responsive to the phase difference signal (velocity signal) is added to the charging part of the sawtooth wave voltage which is responsive to the velocity signal (phase difference signal), however, the circuit can be constructed to add the above signal by use of the discharging of the capacitor.

Further, this invention is not limited to these embodiments but various variations and modifications may be made without departing from the scope of the invention.

What is claimed is:

1. A circuit for controlling rotation of motor comprising:
   rotational velocity signal generating means for generating a rotational velocity signal responsive to the rotational velocity of a motor whose rotation is to be controlled;
   reference signal generating means for generating a reference signal;
   phase comparing means for comparing the phases of said rotational velocity signal and said reference signal;
   multiplexing means for multiplexing said rotational velocity signal and the output signal of said phase comparing means;
   sample-and-hold means for sampling and holding the output multiplexed signal of said multiplexing means by said rotational velocity signal; and
   controlling means for controlling the rotation of said motor by the output signal of said sample-and-hold means.

2. A circuit for controlling rotation of motor as claimed in claim 1 in which said multiplexing means has a circuit for generating a sawtooth wave signal having a period responsive to said rotational velocity signal, responsive to said rotational velocity signal, and a circuit for multiplexing the output of said phase comparing means to said sawtooth wave signal.

3. A circuit for controlling rotation of motor as claimed in claim 1 in which said multiplexing means includes a charging and discharging circuit including a capacitor which is charged and discharged in response to said rotational velocity signal, and a circuit for charging (or discharging) said capacitor responsive to the output signal of said phase comparing means during the period in which said charging and discharging circuit is performing a charging (or discharging) operation.

4. A circuit for controlling rotation of motor as claimed in claim 1 in which said multiplexing means includes a charging and discharging circuit including a capacitor which is charged and discharged in response to the output of said phase comparing means, and a circuit for charging (or discharging) said capacitor responsive to the rotational velocity of said motor during the period in which said charging and discharging circuit is performing a charging (or discharging) operation.

5. A circuit for controlling rotation of motor as claimed in claim 1 in which said multiplexing means has a first transistor whose base is applied with the output of said phase comparing means, a first differentiator for differentiating said rotational velocity signal, a second transistor whose base is applied with output pulses of said first differentiator and turns ON during the period in which said output pulses exist, and a first capacitor connected to the output side of said first transistor and also connected in parallel with said second transistor, said first capacitor being discharged due to the turning ON of said second transistor and charged during the time said second transistor is OFF by the turning ON of said first transistor, and said sample-and-hold means has a second differentiator for differentiating said rotational velocity signal, a third transistor whose base is applied with the output of said second differentiator, for sampling the terminal voltage of said first capacitor, and a second capacitor for holding the output voltage of said third transistor.

* * * * *